No. 845,013. PATENTED FEB. 19, 1907.
J. SCHMITT.
APPARATUS FOR RECOVERING SULFUR DYESTUFFS FROM WASTE
DYE LIQUIDS AND WASHING LIQUIDS.
APPLICATION FILED APR. 22, 1905.
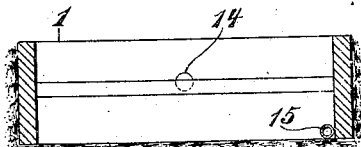
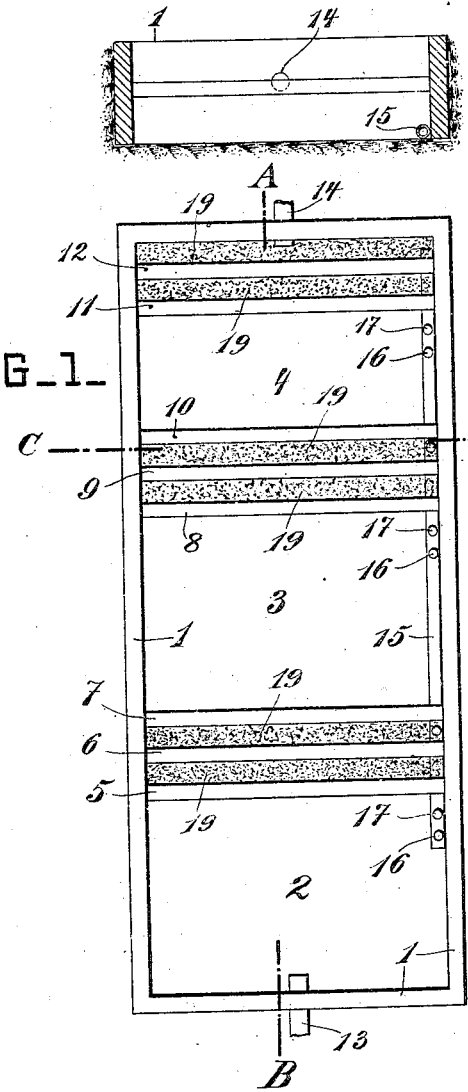
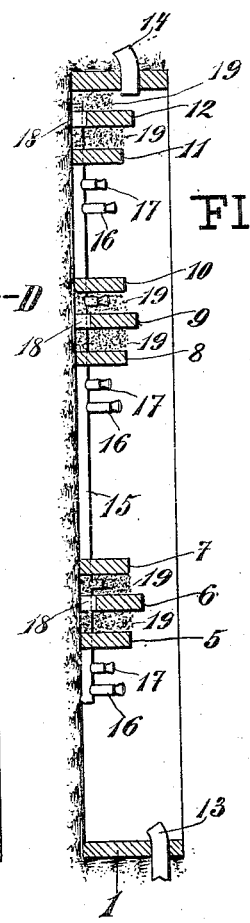

UNITED STATES PATENT OFFICE.

JEAN SCHMITT, OF BELFORT, FRANCE.

APPARATUS FOR RECOVERING SULFUR DYESTUFFS FROM WASTE DYE LIQUIDS AND WASHING LIQUIDS.

No. 845,013.  Specification of Letters Patent.  Patented Feb. 19, 1907.

Application filed April 22, 1905. Serial No. 256,868.

*To all whom it may concern:*

Be it known that I, JEAN SCHMITT, a subject of the Emperor of Germany, and a resident of Belfort, France, have invented certain Improvements in Apparatus for Recovering Sulfur Dyestuffs from Waste Dye Liquids and Washing Liquids, of which the following is a specification.

This invention relates to an apparatus for recovering sulfur dyestuffs from wasted or exhausted dye-baths and from liquids which have been used to wash articles or goods dyed with such dyestuffs. Its object is to effect an important economy in the consumption of such a dyestuff and to permit a clear effluent to be discharged.

This apparatus consists of an open recovering-tank divided into low but large decanting-compartments, allowing the heavier particles of dyestuffs in suspension to sink down therein by their gravity and having between these compartments filtering-receptacles to retain the lighter particles of dyestuff, said receptacles containing a suitable filtering material and formed by two low and tight partitions adapted to be overflowed by the decanted liquid, and an intermediate higher partition with one or more openings at its lower part for the passage of the liquid. This combination of alternately-arranged decanting-compartments and filtering-receptacles not only accelerates the recovering operation, but it also avoids premature obstruction of the filtering material by the larger particles of the dyestuff, such larger particles having time enough to deposit themselves in the larger decanting-compartments. On the other hand, the recovering-tank being open in all its parts, the different compartments and receptacles are readily accessible, while the scant depth of these compartments and receptacles allows a ready examination of the flow of the liquid.

In the accompanying drawings, which illustrate an embodiment of the invention, Figure 1 is a plan of the apparatus. Fig. 2 is a vertical longitudinal section of the same on the line A B of Fig. 1. Fig. 3 is a vertical transverse section of the apparatus on the line C D of Fig. 1.

The apparatus consists of an open recovering-tank 1, built up, for example, of masonry and divided into shallow but laterally large decanting-compartments 2 3 4 by low partitions 5 6 7 8 9 10 11 12. These partitions are arranged by groups and constitute filtering-receptacles between the successive decanting-compartments. The first filtering-receptacle, arranged between the decanting-compartments 2 3, comprises the partitions 5 6 7, the outer ones of which, 5 and 7, extend to about the same height, while the central one, 6, extends to a greater height than the others and is provided at or near the bottom of the tank with an opening or passage or openings or passages 18. The second filtering-receptacle, arranged between the decanting-compartments 3 4, is of the same construction. It comprises the partitions 8 9 10, the outer ones of which are indicated by 8 and 10, while the intermediate higher one is indicated by 9 and has also one or more openings or passages 18 at or near the bottom of the tank. The third or last filtering-receptacle has a slightly-modified arrangement in the sense that it is constructed by the partitions 11 12 and the end wall of the tank, the intermediate partition 12 being also provided with one or more openings 18 at its base and extending to a greater height than the partition 11. As shown, each filtering-receptacle has two spaces formed by the three partitions or walls of the group and which communicate with one another through the opening or openings at the base of the intermediate partitions 6, 9 and 12, respectively. These spaces of the filtering-receptacles are filled with a suitable filtering material 19—such as faggots, small branches, hay, straw, or other inert material which is capable of arresting the dyestuffs in suspension in the liquid.

13 indicates an inlet at one end of the tank for introducing the liquid to be treated into the first decanting-compartment 2 of the tank, and at the opposite end of the tank an outlet 14 is provided for the discharge of the filtered liquid.

A pipe system 15 is disposed lengthwise in the tank and extends through the decanting-compartments and the filtering receptacles. This pipe is provided with upright outlets 16 17, extending to different heights and having closing means, such as stoppers or cocks, so that the residual liquid in any compartment may be decanted successively at different heights through the said outlets and the discharging-pipe 15.

The liquid to be treated is led into the first decanting-compartment 2 through the inlet 13. This compartment is of relatively large size and may have conveniently a capacity of, say, thirty-six cubic meters. In this first compartment the precipitation of the dyestuff takes place by the addition to the liquid of a suitable precipitant—such, for example as sulfuric acid—and as the liquid is substantially at rest in this compartment all the heavier particles of the precipitated dyestuff may sink down therein by their gravity, so that a preliminary clearing of the liquid may be obtained. The liquid thus freed from its heavier particles of dyestuff penetrates through the first filtering-receptacle. When it arrives at the level of the upper edge of the partition 5, which has, for example, a height of one meter, it flows over and passes through the filtering material, which constitutes a strainer, and rises through the second straining-space contained between the walls 6 and 7, passing through the holes in the lower part of the intermediate wall 6, and finally flowing over the edges of the partition 7 into the second decanting-compartment 3, leaving in the filtering material of the traversed filtering-receptacle a considerable portion of the lighter particles of the dyestuff.

In the second compartment 3 the liquid is allowed to stand substantially and may thus deposit the particles of dyestuff which it still contains, whereupon it falls or flows to the third decanting-compartment 4, being further strained or filtered on its passage through the second filtering-receptacle, and so on, so that the liquid by this alternate decanting and filtering becomes absolutely clear and pure, whereby the filtering material is prevented from being prematurely obstructed, as the heavier or greater particles of dyestuff are allowed to deposit by gravity in the larger decanting-compartments of the tank. The liquid thus cleared or deprived of the dyestuffs it contains in suspension then flows off from the apparatus at the outlet 14.

If desired, the residual liquid in any compartment may be withdrawn successively at different heights by means of the outlets 16 and 17 of the discharge-pipe 15, which extend to different heights in the tank and through which liquid may be withdrawn when desired by pumps or the like or by gravity. The deposited dyestuff may then be collected in and removed from the compartments of the tank.

Having thus described my invention, I claim—

1. An apparatus for the purpose specified, comprising an open recovering-tank divided into shallow but laterally large decanting-compartments, allowing the heavier particles of dyestuff in suspension to sink down therein by their gravity and having between these compartments filtering-receptacles to retain the lighter particles of dyestuff, said receptacles containing a suitable filtering material and formed by two low and tight partitions adapted to be overflowed by the decanted liquid, and an intermediate higher partition with one or more openings at its lower part for the liquid.

2. An apparatus for the purpose specified, comprising an open recovering-tank divided into shallow but laterally-extended decanting-compartments, and having between them filtering-receptacles, and a discharging device for the residual liquid, said device having openings arranged on different heights and permitting the withdrawal of the residual liquid at successively different heights.

3. An apparatus for the purpose specified, comprising an open recovering-tank divided into shallow but laterally-extended decanting-compartments, which permit the heavier particles of the dyestuff in suspension to sink down therein by gravity, and having between these compartments filtering-receptacles to retain the lighter particles of the dyestuff, said receptacles containing a suitable filtering material and being formed by two low and tight partitions adapted to be overflowed by the decanted liquid and an intermediate higher partition with one or more openings at its lower part for the liquid, and a pipe system connecting with said tank, having openings arranged on different heights and permitting the withdrawal of the residual liquid at successively different heights.

In witness whereof I have hereunto signed my name, this 10th day of April, 1905, in the presence of two subscribing witnesses.

JEAN SCHMITT.

Witnesses:
  EUG. BAUM,
  AVISE F.M. RIDDETT.